United States Patent
Klotz

(10) Patent No.: US 9,481,113 B2
(45) Date of Patent: Nov. 1, 2016

(54) PLANT FOR MAKING CONTINUOUS ELASTIC YARNS MADE OF SILICONE MATERIAL

(75) Inventor: Thomas Klotz, Desenzano del Garda (IT)

(73) Assignee: LEMUR S.P.A., Melegnano (IT)

( * ) Notice: Subject to any disclaimer, the term of this patent is extended or adjusted under 35 U.S.C. 154(b) by 1264 days.

(21) Appl. No.: 13/125,266

(22) PCT Filed: Oct. 20, 2009

(86) PCT No.: PCT/IB2009/007164
§ 371 (c)(1),
(2), (4) Date: Apr. 20, 2011

(87) PCT Pub. No.: WO2010/046750
PCT Pub. Date: Apr. 29, 2010

(65) Prior Publication Data
US 2011/0200821 A1    Aug. 18, 2011

(30) Foreign Application Priority Data

Oct. 21, 2008   (IT) .............................. UD2008A0222

(51) Int. Cl.
*D01D 5/084*   (2006.01)
*D01D 5/098*   (2006.01)
(Continued)

(52) U.S. Cl.
CPC ........... *B29C 35/10* (2013.01); *B29C 47/0004* (2013.01); *B29C 47/08* (2013.01);
(Continued)

(58) Field of Classification Search
CPC ...... D01D 5/084; D01D 5/088; D01D 5/092; D01D 5/098; D01D 5/12; D01D 5/16
USPC .......... 425/66, 72.2, 144, 377, 378.2, 379.1, 425/382.2, 404, 445, 464
See application file for complete search history.

(56) References Cited

U.S. PATENT DOCUMENTS 3,053,611 A * 9/1962 Griehl ........................ 264/210.8
4,035,129 A   7/1977 Karppo et al.
(Continued)

FOREIGN PATENT DOCUMENTS

CN    1-217756 A   5/1999
DE    3 802 527 A1   8/1988
(Continued)

OTHER PUBLICATIONS

International Search Report in parent PCT No. PCT/IB2009/007164 (Aug. 4, 2010) (4 pages).
(Continued)

*Primary Examiner* — Yogendra Gupta
*Assistant Examiner* — Joseph Leyson
(74) *Attorney, Agent, or Firm* — Flaster/Greenberg P.C.

(57) ABSTRACT

A plant for making continuous yarns (30) made of silicon material comprises at least an extrusion station (12), into which the material is introduced in an amorphous condition, and extrusion means (15) which cause the material to exit from the extrusion station (12) along an extrusion axis (D). The plant also comprises a vulcanization station (16), located downstream of the extrusion station (12), at a determinate distance ("L") therefrom, in which the continuous yarn (30) is vulcanized in a direction of treatment (T). The plant also comprises a drawing unit (18), disposed downstream of the vulcanization station (16).

6 Claims, 1 Drawing Sheet

(51) Int. Cl.

| | | |
|---|---|---|
| *B29C 35/10* | (2006.01) | |
| *D01D 5/092* | (2006.01) | |
| *D01D 5/088* | (2006.01) | |
| *B29C 47/00* | (2006.01) | |
| *B29C 47/08* | (2006.01) | |
| *B29C 47/12* | (2006.01) | |
| *D01D 5/16* | (2006.01) | |
| *D01D 13/02* | (2006.01) | |
| *D01F 6/76* | (2006.01) | |
| *D01F 11/08* | (2006.01) | |
| *B29C 47/38* | (2006.01) | |
| *B29C 35/02* | (2006.01) | |
| *B29C 47/34* | (2006.01) | |
| *B29C 47/36* | (2006.01) | |
| *B29C 47/68* | (2006.01) | |
| *B29C 47/82* | (2006.01) | |
| *B29C 35/08* | (2006.01) | |
| *B29K 83/00* | (2006.01) | |
| *B29K 301/10* | (2006.01) | |
| *B29L 31/00* | (2006.01) | |
| *B29C 47/10* | (2006.01) | |

(52) U.S. Cl.
CPC ............ *B29C 47/12* (2013.01); *B29C 47/364* (2013.01); *B29C 47/38* (2013.01); *B29C 47/822* (2013.01); *B29C 47/825* (2013.01); *D01D 5/084* (2013.01); *D01D 5/088* (2013.01); *D01D 5/092* (2013.01); *D01D 5/098* (2013.01); *D01D 5/16* (2013.01); *D01D 13/02* (2013.01); *D01F 6/76* (2013.01); *D01F 11/08* (2013.01); *B29C 35/02* (2013.01); *B29C 35/0277* (2013.01); *B29C 47/0014* (2013.01); *B29C 47/0057* (2013.01); *B29C 47/1009* (2013.01); *B29C 47/34* (2013.01); *B29C 47/367* (2013.01); *B29C 47/68* (2013.01); *B29C 47/686* (2013.01); *B29C 47/82* (2013.01); *B29C 2035/0827* (2013.01); *B29C 2035/0855* (2013.01); *B29K 2083/00* (2013.01); *B29K 2083/005* (2013.01); *B29K 2301/10* (2013.01); *B29L 2031/707* (2013.01); *Y10T 428/298* (2015.01)

(56) References Cited

U.S. PATENT DOCUMENTS

| | | | |
|---|---|---|---|
| 4,155,695 A | | 5/1979 | Karppo |
| 4,704,335 A | * | 11/1987 | Landry et al. ............... 428/34.5 |
| 4,789,507 A | | 12/1988 | Wesley |
| 4,830,461 A | | 5/1989 | Ishiharada et al. |
| 4,902,461 A | * | 2/1990 | Schippers ..................... 264/103 |
| 4,937,029 A | | 6/1990 | Ishiharada et al. |
| 5,149,193 A | * | 9/1992 | Faillace ....................... 366/145 |
| 5,343,601 A | * | 9/1994 | Schippers ....................... 28/258 |
| 5,648,041 A | * | 7/1997 | Rodgers ................. D01F 9/145 264/103 |
| 5,664,307 A | * | 9/1997 | Stitz et al. ..................... 28/241 |
| 5,964,725 A | | 10/1999 | Sato et al. |
| 6,576,166 B1 | | 6/2003 | Perrin |
| 2004/0058152 A1 | | 3/2004 | Tokarsky |
| 2008/0057816 A1 | | 3/2008 | Aoki |
| 2010/0329629 A1 | | 12/2010 | Reichinger et al. |

FOREIGN PATENT DOCUMENTS

| | | |
|---|---|---|
| DE | 38 44 604 C2 | 8/1996 |
| DE | 196 51 904 A1 | 6/1998 |
| DE | 101 45 945 A1 | 4/2002 |
| EP | 0 233 667 A1 | 8/1987 |
| FR | 2 816 878 | 5/2002 |
| GB | 2 319 036 A | 5/1998 |
| JP | 52-086434 A | 7/1977 |
| JP | 53-52727 A | 5/1978 |
| JP | 62-191506 A | 8/1987 |
| JP | H08-260252 A | 10/1996 |
| JP | H09-286920 A | 4/1997 |
| JP | 2008-080577 A | 4/2008 |
| JP | 2008-081920 A | 4/2008 |
| WO | WO 97/35053 A1 | 9/1997 |
| WO | WO 02/063087 A1 | 8/2002 |
| WO | WO 2008-074622 A1 | 6/2008 |
| WO | WO 2009/015825 A2 | 5/2009 |

OTHER PUBLICATIONS

Written Opinion in parent PCT No. PCT/IB2009/007164 (Aug. 4, 2010) (6 pages).
Chinese Office Action PCT Application No. 2009/80147314.1 (May 6, 2013) 7 pages.
European Office Action (Sep. 24, 2014), 6 pages.
Japanese Office Action Patent Application No. 2011/532729 (Jun. 25, 2013) 4 pages.

* cited by examiner

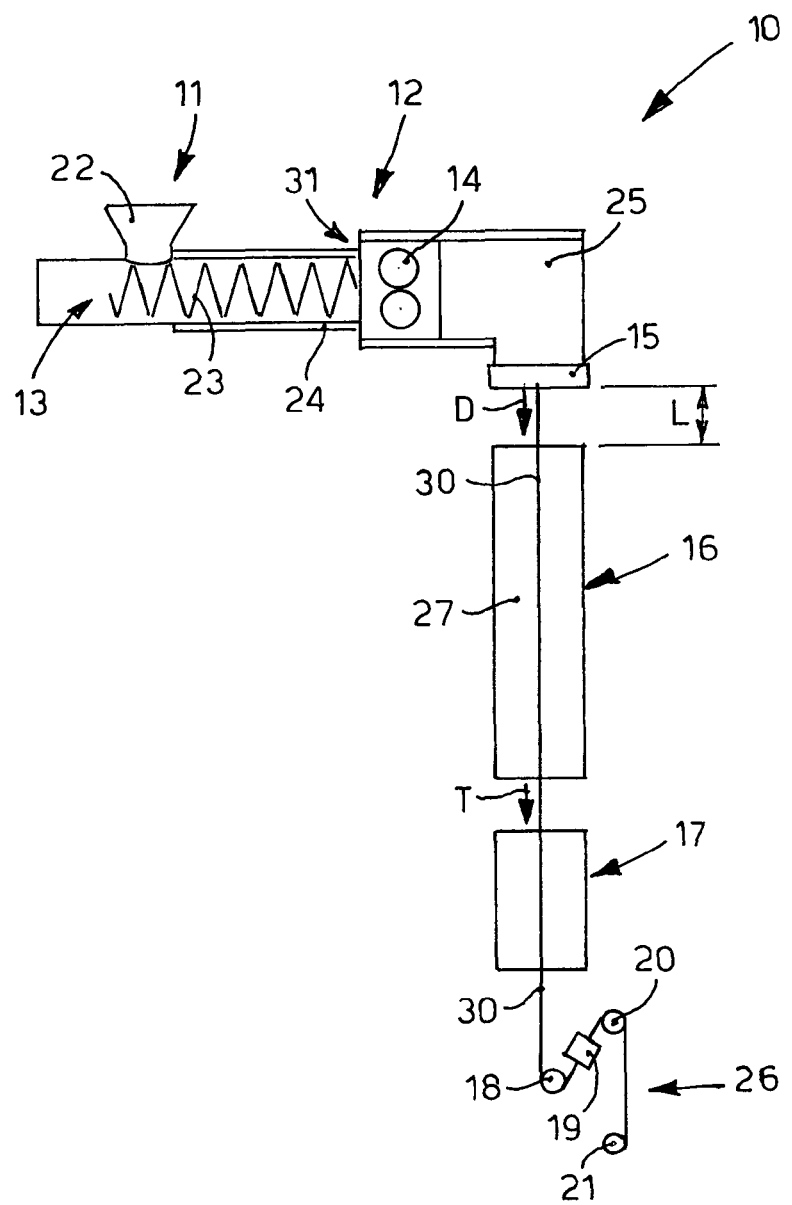

US 9,481,113 B2

PLANT FOR MAKING CONTINUOUS ELASTIC YARNS MADE OF SILICONE MATERIAL

BACKGROUND OF THE INVENTION

1. Field of the Invention

The present invention concerns a plant for making continuous elastic yarns of silicone material usable in the medical field, that of protective technical fabrics and in those industrial fields for which elastic yarns are required with a section of less than 0.7 mm, advantageously 0.3-0.4 mm, and even as little as 0.2-0.1 mm, resistant to certain chemical agents and/or to high or low temperatures, and in particular cases usable as electric conductors. In particular, the present invention can be used to make so-called elastic yarns of silicone rubber.

The present invention also concerns the continuous elastic yarn obtained using the plant.

Here and hereafter in the description and claims, the term elastic yarn means generally a continuous extruded product, either filiform or with a different profile, for example packings, with a count higher than a bead, filament, thread or profile, that is, the multi-filament type.

2. Description of Related Art

Plants are known, for the extrusion of silicone material used to make extruded products of various section and thickness.

Known plants normally extend horizontally and comprise, in succession, feed means that feed the material in the form of paste, an extrusion station, in which the extruded product is made, and a vulcanization station.

This type of known plant has the disadvantage that the extruded product, at the end of the extrusion process, is deposited on a conveyor belt or strip that normally advances at a speed substantially equal to the speed of extrusion.

Since this feed occurs horizontally, or substantially horizontally, the extruded product being made is affected both by the extrusion pressure and also the force of gravity, under the action of which the extruded product tends to modify its section, flattening before entering the vulcanization station, so that, at entrance to the vulcanization station, the extruded product no longer has the correct section but is deformed, mainly due to the extrusion pressure.

This problem is accentuated when the extruded products to be made are particularly fine, for example in the case of silicone based elastic yarns with a diameter of less than 0.7 millimeters, to as little as 0.2 and 0.1 mm.

This problem also makes it very difficult to have a precise control on the value of section obtained, and also it does not allow to guarantee a uniform section over the length of the yarn.

Moreover, known plants do not allow to extrude materials such as silicone rubber, with a reduced section and in the liquid state, or at least not totally solid, because the elastic yarn exiting from the extrusion station would not be firm enough to be deposited on a conveyor belt or to be held by clamping means and drawn through the vulcanization station.

Another disadvantage of known plants is that the type of oven usually used in the vulcanization station are normally moved manually on each occasion, to be moved closer to or away from the vulcanization station, depending on the type of extruded product to be processed, but this interrupts the production process and increases both the economic cost and the production times, and also does not guarantee precision positioning.

Known solutions for producing extruded products made of silicone material work on thicknesses having a slightly larger size than those sought in the present invention, such as for example DE-C2-38 44 60.

Other solutions work on products in which the field of use is completely different from the production of elastic yarns according to the present patent application, such as DE-A1-101 45 945, which concerns the production of multi-layer optical cables, or W-A1-2008/074622, which concerns the production of windscreen wiper brushes, that is, with values of size and quality that cannot be compared with those required in continuous elastic yarns which are the object of the present patent application.

Purpose of the present invention is to achieve a plant for the continuous production of elastic yarns made of silicone material that overcomes the shortcomings of the state of the art and allows to make elastic yarns, simply and economically, with a section of much less than 0.7 mm, advantageously less than 0.4 mm and even 0.2-0.1 mm.

The Applicant has devised, tested and embodied the present invention to overcome the shortcomings of the state of the art and to obtain these and other purposes and advantages.

BRIEF SUMMARY OF THE INVENTION

The present invention is set forth and characterized in the independent claims, while the dependent claims describe other characteristics of the invention or variants to the main inventive idea.

In accordance with the above purpose, a plant for making continuous elastic yarns made of silicone material comprises at least an extrusion station, a vulcanization station located downstream of the extrusion station at a determinate adjustable distance therefrom, and at least a drawing unit, located downstream of the vulcanization station and able to impart on the elastic yarn exiting from the extrusion station a drawing value in a ratio comprised between 2 and 6 (100-500%) before vulcanization.

The extrusion station is provided with an extrusion body, in which the material is able to be introduced in an amorphous condition, and extrusion means, able to allow the material to exit from the extrusion station along an extrusion axis, conditioning the shaping thereof.

The extrusion means are conformed so as to confer on the extrusion axis a substantially vertical direction, so that the elastic yarn exiting, disposed with a substantially vertical axis, is drawn due to the effect of the drawing unit, with the desired drawing ration and set according to at least the final thickness to be obtained, at least along the adjustable distance between the extrusion station and the vulcanization station.

The drawing action determines on the one hand the desired lengthening of the elastic yarn and thinning to the desired value of thickness, and on the other hand the uniformity and regularity of its section; it also orients in a more regular manner the molecular chains inside the elastic yarn, allowing to obtain values of lengthening and force above the standard of the base product.

The use of a drawing unit with a high drawing ration also allows to eliminate the deformation effect of the force of gravity that acts upstream of the vulcanization station, which in known solutions with at least partly vertical extrusion, determines deformations and inaccuracies in the section.

Moreover, in particular in the case of very thin extruded products, it reduces the effect of the heat abatement caused by the introduction of the yarn inside the vulcanization oven, before the vulcanization treatment is completed.

In this way, continuous yarns of any length can be produced, and they have no surface imperfections, with constant technical-elastic characteristics for their whole length and with no deformation in section.

A plant according to the present invention can therefore be used to make elastic yarns with controlled and uniform sections even much less than 0.7 mm, as little as 0.4-0.3 mm and less.

Furthermore, since no horizontal movement is provided, it is also possible to introduce into the vulcanization station elastic yarns that are still in a liquid, plastic or at least not solid state.

According to a variant, the plant provides a collection unit, located downstream of the vulcanization station, and able to collect the yarn exiting from the vulcanization station.

In another variant, the collection unit comprises said drawing unit so that the elastic yarn, in the segment between the exit from the extrusion means and the entrance to the vulcanization station, reduces its section to the desired value while still keeping the regularity and quality of the section shape.

According to a variant, a plant according to the present invention comprises a controlled cooling station, located downstream of the vulcanization station and upstream of the drawing and possible collection unit.

The cooling station is able to cool the elastic yarn to a temperature near the environmental temperature, so as to prevent the finished product from continuing the crystallization process also after collection and storage.

According to a variant, the vulcanization station comprises a zonal vulcanization oven, each zone being characterized by a heating system: high temperature, ultraviolet rays, microwaves or other.

According to another feature of the present invention, the vulcanization station is selectively movable in a vertical direction, and is heat adjustable according to the type of elastic yarn treated. This solution allows to select the temperature of the various zones of the vulcanization oven with a simple programming of the plant, reducing manpower and equipping times.

According to another variant, the cooling station is also selectively movable in a vertical direction and is heat adjustable according to the type of extruded product treated.

BRIEF DESCRIPTION OF THE SEVERAL VIEWS OF THE DRAWINGS

These and other characteristics of the present invention will become apparent from the following description of a preferential form of embodiment, given as a non-restrictive example with reference to the attached drawing wherein:

FIG. 1 is a lateral schematic view of a plant for making elastic yarns made of Silicone material according to the present invention.

DETAILED DESCRIPTION OF THE INVENTION

With reference to the attached drawing, a plant 10 according to the present invention is used to make extruded products of silicone material, in this case continuous elastic yarns 30, with a thickness of less than 0.7 mm, advantageously 0.3-0.4 mm, as little as 0.1 mm, of Silicone rubber.

The plant 10 comprises feed means 11, an extrusion station 12, a vulcanization station 16, a cooling station 17 and a drawing unit and collection 26 of the yarn 30.

The feed means 11 feed the extrusion station 12 and are automatic.

In this case, the feed means 11 comprise a hopper 22, dosing pumps, able to introduce into the hopper 22 the correct quantity of material according to the capacity of the plant, and static and dynamic mixers, able to mix the material so as to prevent the formation of air bubbles.

The feed means 11 also provide a device able to keep the level of material inside the hopper 22 constant, so as to also keep constant the exit pressure of the material from the hopper 22.

According to a variant, in the case of material in the form of paste, the feed means 11 comprise a roller or a pair of rollers cooperating with each other, which feed the material in the form of a strip.

According to another variant, in the case of a continuous strip of material, the feed means 11 comprise a conveyor belt on which the strip is disposed.

The extrusion station 12 comprises an extrusion body 31 and extrusion means 15.

The extrusion body 31 is provided with compression means 13, dosing means 14 and a device 25 to distribute the material.

The compression means 13 compress the material and thrust it toward the dosing means 14. In this case, the compression means 13 comprise a worm screw, sized according to the capacity of the plant 10, and a degassing zone, to eliminate the possible formation of air bubbles.

According to a variant, the compression means 13 provide a piston device.

The dosing means 14 are able to dose the material compressed by the compression means 13 so as to feed the device 25 to distribute the material in a uniform and continuous manner.

In this case, the dosing means 14 comprise a dosing pump with gears and a plurality of pressure transducers, coordinated with the compression means 13.

The transducers detect the pressure at entrance and at exit to/from the dosing means 14 and, according to this detection, send a signal to the compression means 13 to regulate the speed of the material and to keep a constant delivery through the dosing means 14.

The device 25 to distribute the material feeds the extrusion means 15 uniformly. In this case, the extrusion body 31 has a vertical elbow-type conformation. The material enters the extrusion body 31 in a horizontal direction of feed, due to the effect of the pressure exerted by the compression means 13, and exits from the extrusion means 15 along an axis of extrusion D, with a substantially vertical direction, due to the effect of said pressure and the force of gravity.

According to the conformation of the draw-plate, the yarn 30 obtained at exit from the extrusion means 15 can have a variable number of beads or filaments, for example comprised between 2 and 30.

The draw-plate comprises corresponding perforations having a lead-in to facilitate the entry of the material and a bevel at exit to facilitate the detachment of the material.

According to a variant, the extrusion body 31 has a horizontal conformation.

According to a variant, the extrusion body 31 has a vertical conformation.

According to a variant, upstream of the draw-plate the extrusion means 15 comprise at least a filter and at least a pre-drawing plate, advantageously two filters and two pre-drawing plates. This is particularly advantageous to prevent obstruction of the perforations of the draw-plate and to distribute the material better, in the case where the extrusion means 15 include a draw-plate each, equipped with a plurality of perforations for the simultaneous production of a corresponding plurality of elastic yarns.

The presence of the filters upstream of the draw-plate is extremely important so as to be able to break the memory effect that the extrusion screw imparts to the material. The filters are chosen of a size such as to prevent the yarn, descending vertically, from twisting, knocking and from preventing the spinning.

The extrusion station 12 also comprises a heating and cooling device 24 for the automatic heat-regulation of the various zones of the extrusion station 12, so as to keep the ideal conditions of extrusion temperature and pressure.

The elastic yarn 30 exiting from the draw-plate advances vertically, drawn by the drawing and collection 26 unit. In this case, the collection unit 26 comprises drawing means 18, such as a motorized roller, which exert a predetermined drawing force on the extruded product 30 and guarantee that the extruded product 30 advances toward the vulcanization station 16, maintaining a substantially vertical direction, without horizontal displacements.

Furthermore, as a consequence of the drawing force of the drawing means 18, the section of the continuous yarn 30 is reduced to the desired size, with a drawing factor that can vary, according to needs, from 2 to 6, in this way reducing the section of the elastic yarn 30 proportionally, yet keeping the quality and uniformity of the section shape high, and orienting the molecular chains in a more regular way.

The vulcanization station 16 comprises a zonal oven 27, each zone being characterized by a heating system: high temperature, ultraviolet rays, or microwaves.

Inside the oven 27, the elastic yarn 30 is treated in a direction of treatment "T", substantially vertical and parallel to the axis of exit "D" of the yarn from the extrusion station 12.

The oven 27 is selectively movable vertically, with known mechanical or pneumatic devices, to be positioned at different distances "L" from the draw-plate according to the type of elastic yarn 30 and the relative crystallization and vulcanization times thereof.

In particular, the variation in the distance "L" between the exit from the extrusion station 15 and entry into the vulcanization oven 27 allows to vary the drawing conditions on the continuous yarn 30 according to the section to be obtained, both in the shape and thickness and also in orientation of the molecular chains, apart from, obviously the type of yarn 30 itself.

In the case of continuous elastic yarns 30 according to the invention, the distance "L" typically varies between 400 and 1500 mm, in particular according to the final thickness of the elastic yarn 30 to be obtained.

The vulcanization oven 27 is heat-adjustable so as to vary the vulcanization temperature according to the type of elastic yarn 30 treated.

The cooling station 17, located downstream of the vulcanization station 16, is able to cool the elastic yarn 30 to a temperature near the environmental temperature so as to prevent the final product from continuing the crystallization process after collection and storage.

The cooling station 17 is heat-regulated so as to guarantee that ideal cooling temperature conditions are maintained, according to the type of elastic yarn 30.

The collection unit also comprises, apart from the aforementioned drawing means 18, surface treatment means 19, control means 20 and collection means 21, of a known type.

The surface treatment means 19 are able to treat the external surface of the extruded product 30 in order to confer upon it determinate physical characteristics.

The control means 20 of the extruded product 30 comprise a roller associated with control devices and are able to control the physical characteristics of the extruded product 30, such as the thickness, uniformity of section, elasticity and others.

The collection means 21 are able to collect and pack the elastic yarn 30 for storage. The collection means 21 comprise an automatic reel-winder or a device to cut the elastic yarn 30 and insert it into containers.

It is clear, however, that modifications and/or additions of parts may be made to the 10 as described heretofore, without departing from the field and scope of the present invention.

I claim:

1. A plant for making continuous elastic yarns made of silicone material, comprising at least an extrusion station, provided with an extrusion body into which said material is able to be introduced in an amorphous condition, and extrusion head able to allow said material to exit from said extrusion station along an extrusion axis, and a vulcanization station comprising a vulcanization oven, located downstream of said extrusion station, at a determinate distance therefrom, wherein:

said extrusion head is disposed so that the extrusion axis is substantially vertical, said distance varies between 400 and 1500 mm according to the final thickness of the elastic yarn to be obtained;

the plant also comprises a drawing unit, disposed downstream of said vulcanization station, and able to impart on the elastic yarn exiting from the extrusion station, a drawing value in a ratio comprised between 2 and 6 (100-500%), reducing the section of the elastic yarn proportionally, before the elastic yarn enters said vulcanization oven of the vulcanization station, and hence at least along said distance, and wherein the vulcanization oven is moveable to adjust said distance between said values 400-1500 mm to vary the drawing conditions of the elastic yarn and to obtain a final yarn with a thickness at least less than 0.7 mm, and having the desired orientation of the molecular chains.

2. The plant as in claim 1, wherein, in said vulcanization station, said extruded product is vulcanized along a processing direction parallel or coincident to the extrusion axis.

3. The plant as in claim 1, wherein said extrusion body has a vertical elbow shape.

4. The plant as in claim 1, comprising a collection unit, located downstream of the vulcanization station and able to collect the extruded product, wherein said collection unit comprises said drawing unit.

5. The plant as in claim 4, comprising a controlled cooling station, located downstream of the vulcanization station and upstream of the collection unit.

6. The plant as in claim 1, wherein the extrusion station comprises a heating and cooling device for the heat regulation of the extrusion station.

* * * * *